(12) United States Patent
Bache et al.

(10) Patent No.: US 10,691,336 B2
(45) Date of Patent: Jun. 23, 2020

(54) FILE-BASED CUSTOM CONFIGURATION OF DYNAMIC KEYBOARDS

(71) Applicant: ADOBE INC., San Jose, CA (US)

(72) Inventors: Jesper Storm Bache, Menlo Park, CA (US); Bradee Rae Evans, Alameda, CA (US)

(73) Assignee: ADOBE INC., San Jose, CA (US)

( * ) Notice: Subject to any disclaimer, the term of this patent is extended or adjusted under 35 U.S.C. 154(b) by 175 days.

(21) Appl. No.: 15/458,477

(22) Filed: Mar. 14, 2017

(65) Prior Publication Data

US 2018/0267704 A1    Sep. 20, 2018

(51) Int. Cl.
*G06F 3/0488*    (2013.01)
*G06F 3/0487*    (2013.01)

(52) U.S. Cl.
CPC ........ *G06F 3/04886* (2013.01); *G06F 3/0487* (2013.01)

(58) Field of Classification Search
CPC ............................ G06F 3/04886; G06F 3/0487
USPC ........................................................ 715/773
See application file for complete search history.

(56) References Cited

U.S. PATENT DOCUMENTS

| | | | | |
|---|---|---|---|---|
| 5,867,729 A | * | 2/1999 | Swonk | G06F 3/023 345/172 |
| 2009/0183098 A1 | * | 7/2009 | Casparian | G06F 3/0238 715/765 |
| 2010/0265182 A1 | * | 10/2010 | Ball | G06F 3/0238 345/168 |
| 2012/0235921 A1 | * | 9/2012 | Laubach | G06F 3/0238 345/172 |
| 2016/0371080 A1 | * | 12/2016 | Rath | G06F 8/34 |
| 2018/0052527 A1 | * | 2/2018 | Serra-Martin | G06F 3/0238 |

* cited by examiner

*Primary Examiner* — Tadesse Hailu
*Assistant Examiner* — Darrin Hope
(74) *Attorney, Agent, or Firm* — Shook, Hardy, and Bacon L.L.P

(57) ABSTRACT

A customized configuration of controls on a dynamic keyboard is provided for an application using a control configuration file separate from the application. The control configuration file includes a control configuration for each custom control and a layout description. Each control configuration includes a visual description and a command description for a corresponding custom control. The visual description provides data regarding visual aspects of the custom control, while the command description includes data regarding behavioral aspects of the custom control. The layout description includes data for positioning visual representations of the custom controls on a dynamic keyboard. When the application is launched, a storage location is scanned to identify the control configuration file, and the control configuration file is used to configure the custom controls on the dynamic keyboard.

20 Claims, 4 Drawing Sheets

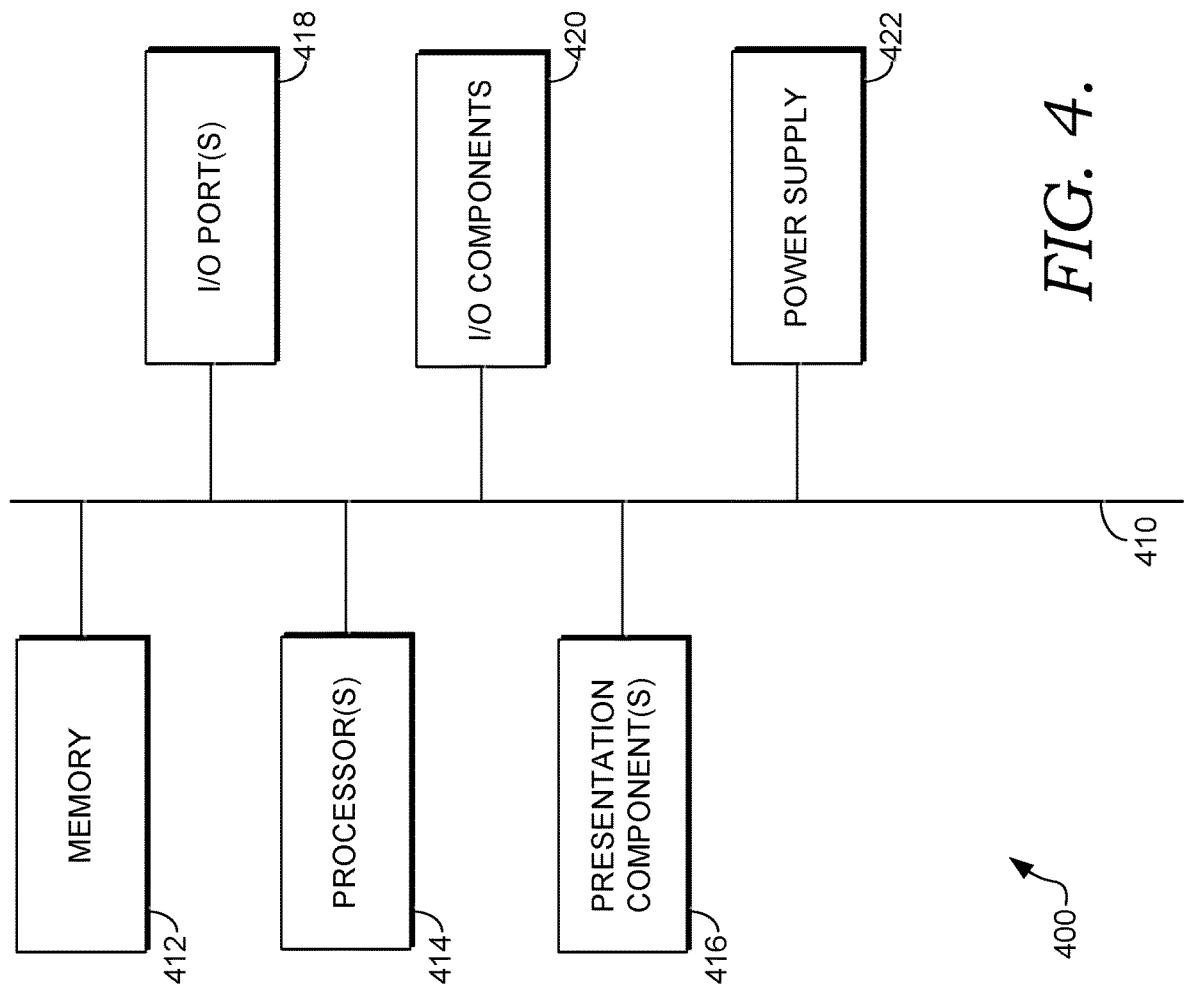

FILE-BASED CUSTOM CONFIGURATION OF DYNAMIC KEYBOARDS

BACKGROUND

Dynamic keyboards are hardware keyboards that allow for customization of functionality. Conventionally, a dynamic keyboard includes a control area that can be configured programmatically to provide a number of controls for a host application. Each control has an icon or other visual representation that is displayed on the control area of the dynamic keyboard. When a user interacts with a control, a command is sent to the host application, which performs an action based on the command. An example of a control area on a dynamic keyboard is the Apple Touch Bar.

Among other things, dynamic keyboards allow for different sets of controls to be provided for different applications. As a user switches from one application to another, the control area on the dynamic keyboard can be updated to the controls for the current active application. While this provides for interactive controls on the hardware keyboard that are application-specific, application developers currently must hardcode the controls for dynamic keyboards into their applications. As a result, the controls included on a dynamic keyboard for an application are fixed based on what the application developer hardcoded into the application.

SUMMARY

Embodiments of the present invention relate to, among other things, providing customized configurations of controls on dynamic keyboards for applications using control configuration files separate from the applications. A control configuration file for an application includes a control configuration for each custom control included. Each control configuration includes a visual description and a command description for a corresponding custom control. The visual description provides data regarding visual aspects of the custom control, while the command description includes data regarding behavioral aspects of the custom control. The control configuration file also includes a layout description that includes data for positioning visual representations of the custom controls on a dynamic keyboard.

When an application is launched, a storage location is scanned to identify a control configuration file for the application. The identified control configuration file is then used to configure custom controls on a dynamic keyboard. In particular, visual representations defined by the visual description for each custom control are displayed on the dynamic keyboard according to the layout description and commands are enabled for the custom controls according to the command descriptions.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 4 is a block diagram of an exemplary computing environment suitable for use in implementations of the present disclosure.

DETAILED DESCRIPTION

Figure 1:
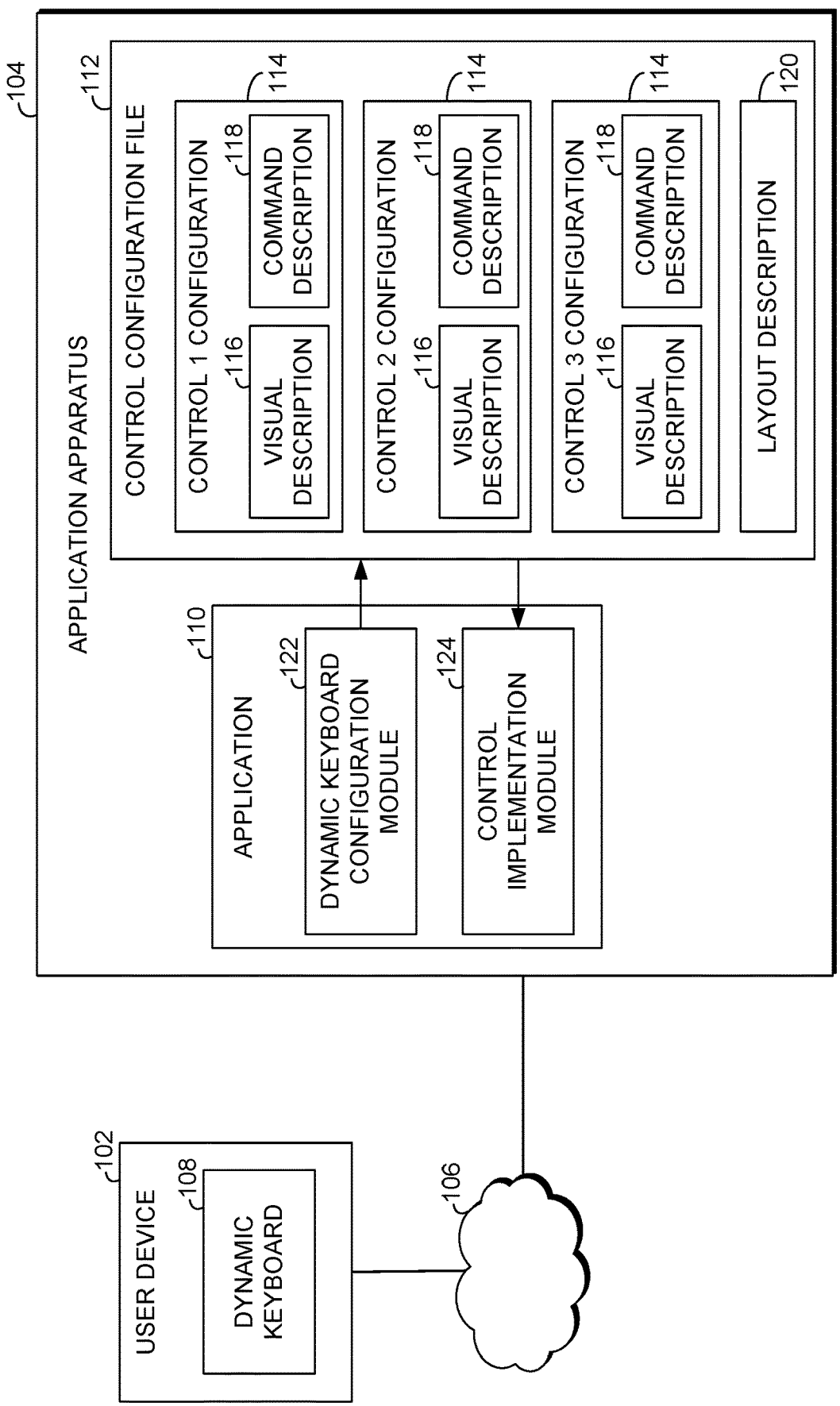
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to providing custom control configurations on dynamic keyboards for applications. Instead of having controls hardcoded into applications by application developers, the technology described herein allows for control configurations that are customizable by users. In accordance with implementations, a control configuration file serves as a persistent representation separate from an application that is used to configure custom controls provided on a dynamic keyboard for the application. The control configuration file includes a control configuration for each of a number of custom controls. Each control configuration file includes a visual description and a command description. The visual description for a custom control provides data regarding visual aspects of the custom control, including a visual representation to be displayed for the custom control. The command description for a custom control includes data regarding behavioral aspects that dictate what actions are performed by the application for the custom control. The control configuration file also includes a layout description that provides data regarding how the custom controls are located on the dynamic keyboard, including how the custom controls are located relative to one another and how the custom controls are located relative to default controls that are also provided on the dynamic keyboard (if any default controls are present).

When an application is launched, a storage area is scanned for a control configuration file for the application. The dynamic keyboard is then configured using the control configuration file. In particular, the dynamic keyboard displays a visual representation for each custom control based on the visual description defined by the control configuration for each custom control. The visual representations are positioned on the dynamic keyboard according to the layout description in the control configuration file. Additionally, commands are enabled for the custom controls according to the command descriptions defined by the control configurations in the control configuration file.

Accordingly, the technology described herein allows users to create custom control configurations by selecting which custom controls to include and the visual appearance of the custom controls. In this way, users are not tied down by hardcoded control configurations. Instead, users can add and remove custom controls and configure how the custom controls look and behave. Further, because the control configuration files are separate from applications, the control configurations are portable. As such, custom control configurations can be migrated between different devices. Additionally, the custom control configurations can be share amongst users.

With reference now to the drawings, FIG. 1 is a block diagram illustrating an exemplary system for providing a custom control configuration to a dynamic keyboard in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system is an example of a suitable architecture for implementing certain aspects of the present disclosure. Among other components not shown, the system 100 includes a user device 102 interacting with an application apparatus 104. Each of the user device 102 and application apparatus 104 shown in FIG. 1 can comprise one or more computer devices, such as the computing device 400 of FIG. 4, discussed below. As shown in FIG. 1, the user device 102 and the application apparatus 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and application apparatuses may be employed within the system 100 within the scope of the present invention. Each may comprise a single device or multiple devices cooperating in a distributed environment. For instance, the application apparatus 104 could be provided by multiple server devices collectively providing the functionality of the application apparatus 104 as described herein. Additionally, other components not shown may also be included within the network environment.

The user device 102 can be any type of computing device, such as, for instance, a personal computer (PC), tablet computer, desktop computer, mobile device, or any other suitable device having one or more processors. As shown in FIG. 1, the user device 102 includes a dynamic keyboard 108, which comprises a keyboard with a control area that can be programmatically configured to include controls for providing input to applications, such as the application 110.

The application apparatus 104 can be implemented using one or more server devices, one or more platforms with corresponding application programming interfaces, cloud infrastructure, and the like. The application apparatus 104 includes an application 110 and a control configuration file 112. The application 110 is any type of computer program configured to, among other things, perform actions in response to commands provided via controls on the dynamic keyboard 108. By way of example only and not limitation, the application 110 could be a web browser, an email application, a calendar application, a media player, a game, productivity software (e.g., word processor, spreadsheet, or presentation software), or content creation/editing software (e.g., audio, video, or image editing software). While FIG. 1 illustrates a configuration in which the application 110 and control configuration file 112 are provided on a device separate from the user device 102 via a networked environment, it should be understood that in further configurations, the application 110 and/or the control configuration file 112 can be provided locally on the user device 102.

The control configuration file 112 allows for a custom control configuration on the dynamic keyboard 108 for the application 110. Generally, the control configuration file 112 includes information regarding which custom controls to include in the dynamic keyboard 108 for the application 110, the visual representation of each custom control, an action or set of actions associated with each custom control, and the layout of the custom controls on the dynamic keyboard 108. While only a single application and a single control configuration file are shown in FIG. 1, it should be understood that the system 100 can include any number of applications and each application can have a corresponding control configuration file to provide a custom control configuration specific to the application. As such, each custom control configuration can be application specific. For instance, the system 100 could include one control configuration file for a word processing application and another control configuration file for a video editing application.

As shown in FIG. 1, the control configuration file 112 for the application 110 includes a control configuration 114 for each custom control included in the custom control configuration. While FIG. 1 shows three control configurations 114 to provide three custom controls, it should be understood that any number of control configurations 114 can be included in the control configuration file 112 to provide any number of custom controls on the dynamic keyboard 108 in accordance with implementations of the present invention.

Each control configuration 114 includes a visual description 116 and a command description 118. The visual description 116 includes data regarding visual aspects of the custom control that dictate the appearance of the custom control when displayed by the dynamic keyboard 108. In some configurations, the visual description 116 includes data setting forth a control type for the custom control, such as identifying the custom control as a button, toggle, or slider, for instance. The visual description 116 also includes data regarding the visual representation to be displayed for the custom control. The visual representation can be any type of digital image, such as an icon, symbol, drawing, or photograph. The visual description 116 may include the visual representation or may include a link or pointer to a visual representation stored at another location. In some configurations, the visual description 116 also includes a text string to provide a label or title that can be displayed with the visual representation for the custom control.

The command description 118 includes data regarding behavioral aspects of the custom control that dictate what commands are provided to the application 110 to perform certain actions in response to user interaction with the custom control. In some instances, the command description 118 sets forth an identifier for a command corresponding to a particular action in the application 110. In other instances, the command description 118 includes data that permits more robust functionality than a single command for a single action in the application 110. For instance, a command description 118 can include instructions based on a scripting language that could be interpreted by the application 110 to perform various actions.

The control configuration file 112 also includes a layout description 120 that includes data defining the layout of the custom controls when displayed on the dynamic keyboard 108. This includes data defining a layout of the custom controls relative to one another, such as a location of the custom controls on the dynamic keyboard 108, an ordering of the custom controls, and/or spacing between the custom controls. In instances in which the custom controls for the application 110 defined by the control configuration file 112 are to be presented with default controls (e.g., default system controls and/or default application-specific controls), the layout description 120 can also include data defining a layout of the custom controls relative to the default controls. For instance, the data can specify that the custom controls are placed above, below, to the left of, to the right of, or in the center of the default controls.

While FIG. 1 illustrates the control configuration file 112 as a single file, it should be understood that the control configuration file 112 in some configurations may comprise a collection of files. As such, when the term "control configuration file" is used herein, the term refers to a single file or a collection of files that collectively provide control configurations and a layout description for a custom control configuration for an application.

The format of the control configuration file 112 may be text (human readable) or in binary (machine) format, and the contents of the configuration file can adhere to a configuration scheme. The scheme identifies valid elements and the valid order of the element in the control configuration file 112. For example, a scheme could specify an order of elements that begins with a control title that is in Unicode format followed by a command specified by a number. The scheme could identify optional elements such as links to external resources that are used to create the visual appearance (e.g., an external resource could be a jpeg file of an image to use for a button).

The system shown in FIG. 1 also includes a dynamic keyboard configuration module 122 and a control implementation module 124. The dynamic keyboard configuration module 122 generates the control configuration file 112 for the application 110. Generally, the dynamic keyboard configuration module 122 provides user interfaces (UIs) that allow a user to customize which custom controls are provided by the dynamic keyboard 108 for the application 110, visual aspects of the custom controls, and the layout of the controls on the dynamic keyboard 108. The dynamic keyboard configuration module 122 can generate the control configuration file 112, for instance, using the method 200 described below with reference to FIG. 2.

The control implementation module 124 arranges the custom control configuration on the dynamic keyboard 108 for the application 110 based on the control configuration file 112. Generally, when the application 110 is launched, the control implementation module 124 scans a storage location for the control configuration file 112. The storage location could be on the user device 102 or a network resource, such as the application apparatus 104. Upon locating the control configuration file 112, the control implementation module 124 applies the control configurations 114 and layout description 120 in order to display and enable the custom controls on the dynamic keyboard 108. The control implementation module 124 can enable the custom control configuration on the dynamic keyboard 108, for instance, using the method 300 described below with reference to FIG. 3.

In some implementations such as that shown in FIG. 1, the dynamic keyboard configuration module 122 and the control implementation module 124 are provided as components of the application 110. In such implementations, the dynamic keyboard configuration module 122 and control implementation module 124 are specific to the application 110. Other applications would include their own application-specific dynamic keyboard configuration module and control implementation module.

In further implementations, a general dynamic keyboard configuration module and/or general control implementation module can be provided separate from any application. The general dynamic keyboard configuration module can generate a control configuration file for any of a number of different applications. When generating a control configuration file for a particular application, the general dynamic keyboard configuration module can communicate with the application to obtain application-specific information, such as actions available for controls for the application. The general control implementation module can likewise configure the custom control configuration for the dynamic keyboard for any of a number of different applications by retrieving and implementing an appropriate control configuration file when an application is launched.

Figure 2:
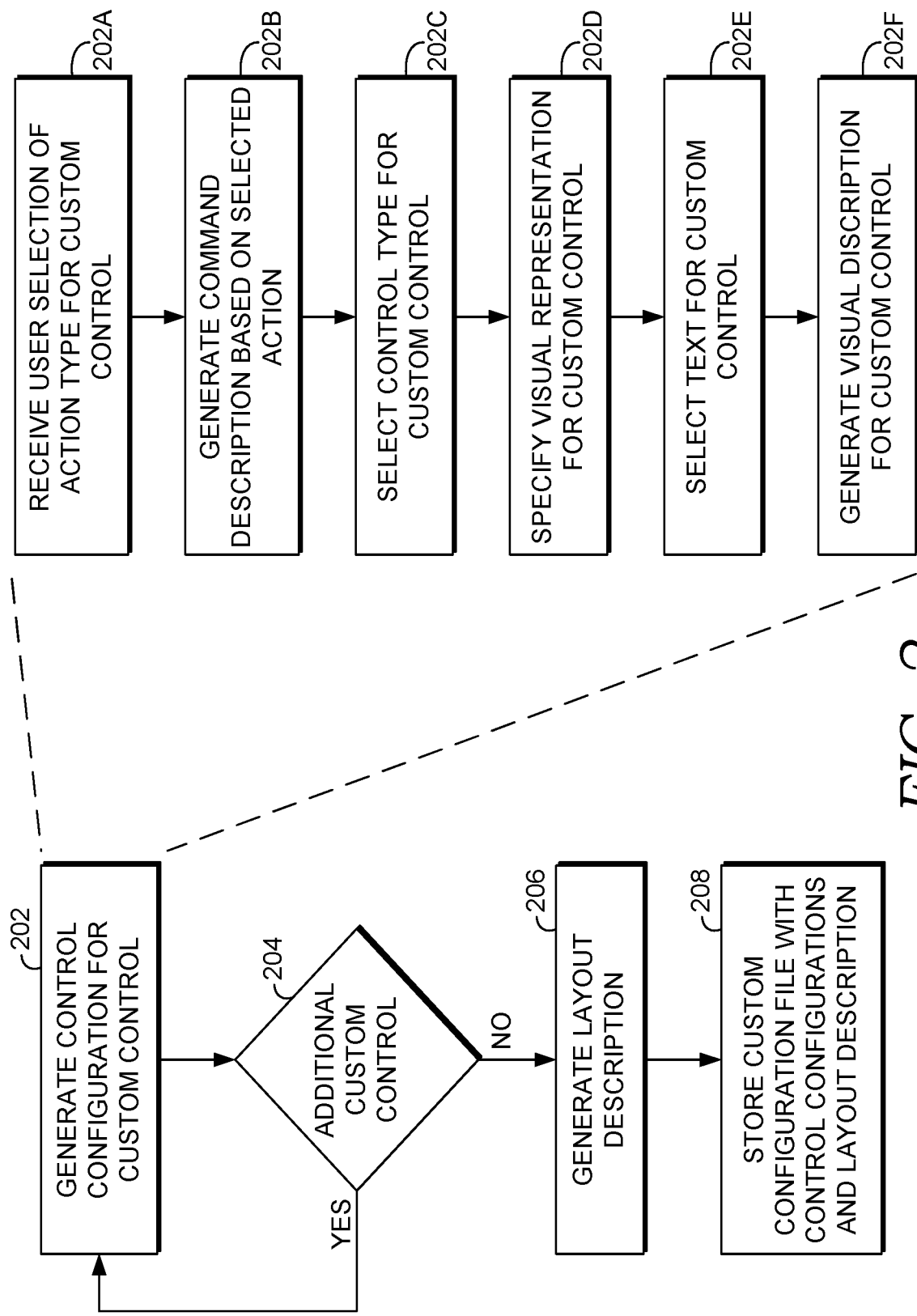
FIG. 2 is a flow diagram showing a method for generating a control configuration file to provide a custom control configuration on a dynamic keyboard in accordance with some implementations of the present disclosure.

With reference now to FIG. 2, a flow diagram is provided that illustrates a method 200 for generating a control configuration file. The method 200 may be performed, for instance, by the dynamic keyboard configuration module 122 of FIG. 1. Each block of the method 200 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 202, a control configuration for a custom control is generated. The control configuration can be generated, for instance, in response to user selections for the custom control received via UIs provided by the dynamic keyboard configuration module 122. In some instances, pre-defined custom controls are available for user selection. Each pre-defined custom control has a control configuration with a specific visual description and specific command description. As such, the user can simply select one of the pre-defined custom controls at block 202.

Alternatively, a control configuration is generated at block 202 based on selective configurations by the user. By way of example to illustrate, blocks 202A-202F illustrate one exemplary process to generate a control configuration. As shown at block 202A, a user selection of a type of action for the custom control is received. As can be understood, while different types of applications may have some similar actions available, the overall set of actions available will vary among applications. For instance, a word processing application would have a set of available actions than differs from a set of available actions for a video editing application. Accordingly, when generating a control configuration of a custom control for a particular application, a UI would list the set of actions available for the application. The user selects an action from the set of actions, and a command description is generated based on the selected action, as shown at block 202B. In the case of a simple command for a single action, the generated command description may simply be an identifier of the command for the action. In the case of more complex actions, the generated command description can include instructions based on a scripting language that could be interpreted by the application to perform the appropriate actions.

The visual description for the custom control is also configured, for instance, via UIs provided by the dynamic keyboard configuration module 122. As shown at block 202C, a control type (e.g., button, toggle, slider, etc.) is selected for the custom control. In some instances, a user selection of a control type is received; while in other instances, the control type is automatically selected based on the type of action selected at block 202A. As shown at block 202D, a visual representation for the custom control is specified. In various configurations, the user can select a visual representation from a number of visual representations made available by the application or the user can select a visual representation from another source separate from the application. At block 202E, text for a label or title for the custom control is selected. In some instances, the user can enter text for the custom control; while, in other instances, the text is automatically selected based on the type of action selected at block 202A. The selected control type, visual representation (or link to a visual representation), and/or text are stored as the visual description for the control, as shown at block 202F.

A determination is made at block 204 regarding whether an additional custom control will be added to the custom control configuration being generated. If so, the process returns to block 202 to generate the control configuration for the additional custom control. When no additional custom controls are added, the process continues to block 206 to generate a layout description for the custom control configuration being generated. The layout description can be generated, for instance, in response to user selections received via UIs provided by the dynamic keyboard configuration module 122. The user can specify a layout of the custom controls relative to one another, such as locations of the custom controls on the dynamic keyboard, an order in which the custom controls are displayed, and/or spacing between the custom controls. In instances in which the custom controls are included with default controls on the dynamic keyboard, the user can also specify a layout of the custom controls relative to the default controls. For instance, the user can specify where the custom controls are displayed on the dynamic keyboard relative to a location of the default controls. The generated control configurations and layout description are stored as a control configuration file, as shown at block 208.

Figure 3:
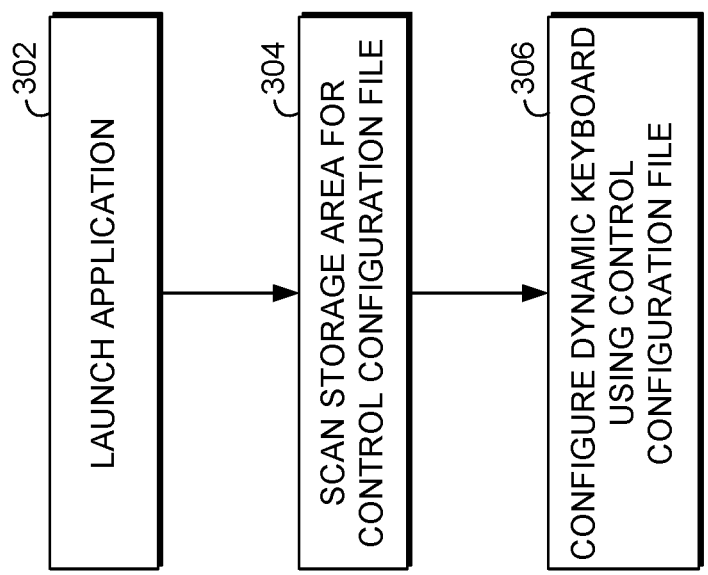
FIG. 3 is a flow diagram showing a method for using a control configuration file to customize a dynamic keyboard for an application in accordance with some implementations of the present disclosure.

Turning next to FIG. 3, a flow diagram is provided showing a method 300 for using a control configuration file to customize a dynamic keyboard for an application. The method 300 may be performed, for instance, by the control implementation module 124 of FIG. 1. As shown at block 302, an application is launched. Upon the application being launched, a storage area is scanned for a control configuration file for the application, as shown at block 304. The storage area may be, for instance, a location on storage where a user has permissions to write files. The storage can be located on a user device (e.g., a hard drive or solid-state drive on the user device) or located on a network resource (e.g., a data server).

In some implementations, scanning and selecting a control configuration file can be determined by a physical location on the storage. For instance, the process can be configured to retrieve all files inside a specified folder. Additionally or alternatively, the storage can be scanned for a control configuration file by searching for a particular type of file. In particular, control configuration files may be available for a number of different applications, and each control configuration file can have a different file type. As such, the process can scan for a particular file type for the control configuration file corresponding to the application being launched. For instance, the process can scan for files with a particular extension. While the above description discusses scanning for a single control configuration file, it should be understood that the control configuration file in practice may comprise a collection of files, and the process can scan for all files that make up the control configuration file for the application.

Upon identifying a control configuration file, the identified control configuration file is used to configure a dynamic keyboard, as shown at block 306. In some instances, the control configuration file provides a complete set of controls for the dynamic keyboard. In other instances, the custom controls from the control configuration file are added to default controls, which may include default system controls and/or default application-specific controls. To configure the dynamic keyboard, a visual representation of each custom control is displayed on the dynamic keyboard according to the custom control's visual description defined by the control configuration file. In some instances, the visual description for a custom control includes the visual representation, which is retrieved from the visual description and displayed. In other instances, the visual description for a custom control includes a reference or link to a visual representation stored elsewhere, and the visual representation is retrieved from that location and displayed. If the visual descriptions for the custom controls also include text for titles. The text included in each visual description is displayed on the dynamic keyboard adjacent to the visual representation for each custom control. The visual representations (and titles, if applicable) of the custom controls are also oriented on the dynamic keyboard according to the layout description defined by the control configuration file. This can include, for instance, positioning or ordering of the custom controls relative to one another, spacing between the custom controls, and/or positioning of the custom controls relative to default controls (if applicable).

Commands are enabled for the custom controls on the dynamic keyboard based on the command description for each custom control. As such, the custom controls on the dynamic keyboard can be employed by a user to perform actions in the application. For instance, when a user interacts with a particular custom control on the dynamic keyboard, a command is sent to the application based on the command description for that custom control. The application performs an action or set of actions in response to the command.

Having described implementations of the present disclosure, an exemplary operating environment in which embodiments of the present invention may be implemented is described below in order to provide a general context for various aspects of the present disclosure. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes bus 410 that directly or indirectly couples the following devices: memory 412, one or more processors 414, one or more presentation components 416, input/output (I/O) ports 418, input/output components 420, and illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion.

As described above, implementations of the present disclosure relate to using control configuration files to customize the configuration of controls on dynamic keyboards. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer system comprising:
  one or more processors; and
  one or more computer storage media storing computer-useable instructions that, when used by the one or more processors, cause the one or more processors to:
    in response to receiving, at a remote server, data representative of an instance of an application stored on a client device being launched by the client device, scan a storage area of the remote server for a control configuration file corresponding to the application, the control configuration file including a plurality of control configurations and a layout description for a dynamic keyboard of the client device;

in response to the scanning the storage area, select the control configuration file; and in response to the selecting the control configuration file, transmit, by the remote server, second data representative of the control configuration file to the client device to cause the dynamic keyboard to be configured using the control configuration file by:

causing the dynamic keyboard to display a visual representation for each user-selected control according to a visual description defined by the control configuration for each user-selected control;

positioning the visual representations of the user-selected controls on the dynamic keyboard according to a layout description; and enabling one or more commands within the application for each user-selected control according to a command description defined by the control configuration for each user-selected control.

2. The system of claim 1, wherein the client device is locally connected to the dynamic keyboard, and the storage area is located on the remote server located remotely from both the client device and the dynamic keyboard.

3. The system of claim 1, wherein the storage area is scanned for the control configuration file by searching for a particular type of file based on the application being launched.

4. The system of claim 1, further storing computer-useable instructions that, when used by the one or more processors, cause the one or more processors to:

in response to another instance of the application being launched on another client device, scan the storage area of the remote server for the control configuration file; and transmit, by the remote server, third data representative of the control configuration file to the another client device to cause another dynamic keyboard of the another client device to be configured using the control configuration file.

5. The system of claim 1, wherein the visual description in the control configuration for a first user-selected control stores the visual representation for the first user-selected control, and wherein the visual description in the control configuration for a second user-selected control stores a link to the visual representation for the second user-selected control.

6. The system of claim 1, wherein positioning the visual representations on the dynamic keyboard comprises positioning the visual representations of the user-selected controls relative to one another according to the layout description.

7. The system of claim 1, wherein the visual representations are displayed on the dynamic keyboard in addition to visual representations of default controls.

8. The system of claim 7, wherein positioning the visual representations on the dynamic keyboard comprises positioning the visual representations of the user-selected controls relative to the visual representations of the default controls according to the layout description.

9. The system of claim 1, wherein the dynamic keyboard is further configured using the control configuration file by causing the dynamic keyboard to display a title for each user-selected control using a text string included in the visual description defined by the control configuration for each user-selected control.

10. One or more non-transitory computer storage media storing computer-useable instructions that, when executed by a computing device, cause the computing device to perform operations, the operations comprising:

receiving, using the computing device, input data representative of one or more inputs corresponding to one or more selections of actions corresponding to commands for an application after launch of the application;

generating, using the computing device, a control configuration for each of a plurality of user-selected controls based at least in part on the one or more selections of the actions, each control configuration including a visual description and a command description for a corresponding user-selected control;

generating, using the computing device, a layout description that includes data specifying a layout of the user-selected controls relative to one another;

transmitting, using the computing device and to a remote server for storage separate from the application, a control configuration file that includes the control configuration for each of the plurality of user-selected controls and the layout description; and upon launch of the application using the computing device, receiving the control configuration file from the remote server and configuring, using the computing device, a dynamic keyboard sing according to the control configuration file.

11. The one or more non-transitory computer storage media of claim 10, wherein generating the control configuration for a first user-selected control from the plurality of user-selected controls comprises:

based at least in part on receiving a first input of the one or more inputs corresponding to a first selection of a first action of the actions, generating the command description for the first user-selected control based at least in part on the first action.

12. The one or more non-transitory computer storage media of claim 10, wherein generating the control configuration for a first user-selected control from the plurality of user-selected controls comprises:

receiving a selection of a control type for the first user-selected control;

receiving an identification of a visual representation for the first user-selected control;

receiving text for the first user-selected control; and generating the visual description for the first user-selected control based on the selected control type, visual representation, and text.

13. The one or more non-transitory computer storage media of claim 12, wherein the visual description for the first user-selected control stores the visual representation.

14. The one or more non-transitory computer storage media of claim 12, wherein the visual description for the first user-selected control stores a link to the visual representation.

15. The one or more non-transitory computer storage media of claim 12, wherein the layout description further includes data specifying a layout of the user-selected controls relative to one or more default controls.

16. The one or more non-transitory computer storage media of claim 10, wherein the control configuration file comprises a collection of files.

17. The one or more non-transitory computer storage media of claim 10, wherein configuring the dynamic keyboard using the control configuration file comprises:

causing the dynamic keyboard to display a visual representation for each user-selected control according to the visual description defined by the control configuration for each user-selected control;

positioning the visual representations of the user-selected controls on the dynamic keyboard according to the layout description; and enabling one or more commands within the application for each user-selected control according to the command description defined by the control configuration for each user-selected control.

18. The one or more non-transitory computer storage media of claim 10, wherein the control configuration file is received from the remote server in response to the remote server searching a storage area for a particular type of file based on an indication of the application being launched, the indication represented in a request received from the computing device.

19. The one or more non-transitory computer storage media of claim 18, wherein, upon launch of another instance of the application on another computing device, receiving, using the another computing device, the control configuration file from the remote server.

20. A computing device comprising:

means for generating a control configuration file for providing a user-selected control configuration on a dynamic keyboard for an application, the control configuration file including a plurality of control configurations and a layout description, each control configuration including a visual description and a command description for a corresponding user-selected control;

means for transmitting the control configuration file to a remote server for storage by the remote server;

means for receiving, in response to launching the application by the computing device, the control configuration file from the remote server; and means for configuring the dynamic keyboard using the control configuration file upon receipt of the control configuration file from the remote server.

* * * * *

UNITED STATES PATENT AND TRADEMARK OFFICE
CERTIFICATE OF CORRECTION

PATENT NO. : 10,691,336 B2
APPLICATION NO. : 15/458477
DATED : June 23, 2020
INVENTOR(S) : Jesper Storm Bache et al.

Page 1 of 1

It is certified that error appears in the above-identified patent and that said Letters Patent is hereby corrected as shown below:

In the Claims

In Column 12, Line 24, Claim 10, after "keyboard" delete "sing".

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*